United States Patent [19]

Schrewelius

[11] 4,174,971
[45] Nov. 20, 1979

[54] SILICON CARBIDE BODY CONTAINING A MOLYBDENUM DISILICIDE ALLOY

[75] Inventor: Nils G. Schrewelius, Hallstahammar, Sweden

[73] Assignee: Bulten-Kanthal Aktiebolag, Sweden

[21] Appl. No.: 918,045

[22] Filed: Jun. 22, 1978

Related U.S. Application Data

[63] Continuation of Ser. No. 749,777, Dec. 13, 1976, abandoned.

[30] Foreign Application Priority Data

Dec. 11, 1975 [SE] Sweden .............................. 7513997

[51] Int. Cl.² .................... C04B 35/56; C04B 35/58
[52] U.S. Cl. .................................................... 106/44
[58] Field of Search ........................................ 106/44

[56] References Cited

U.S. PATENT DOCUMENTS

| 3,036,017 | 5/1962 | Schrewelius | 106/44 |
| 3,189,472 | 6/1965 | Taylor | 106/44 |
| 3,285,018 | 11/1966 | Henderson et al. | 106/44 |
| 4,016,313 | 4/1977 | Schrewelius | 106/44 |

FOREIGN PATENT DOCUMENTS

1161693  1/1964  Fed. Rep. of Germany ............ 106/44

*Primary Examiner*—O. R. Vertiz
*Assistant Examiner*—Mark Bell
*Attorney, Agent, or Firm*—Hill, Van Santen, Steadman, Chiara & Simpson

[57] ABSTRACT

A silicon carbide body wherein the silicon carbide forms a skeleton which is pore free in itself, occupies at least 70 percent by volume of the body volume and has the intercommunicating cavities thereof filled entirely by an almost porefree molybdenum disilicide alloy.

3 Claims, No Drawings

SILICON CARBIDE BODY CONTAINING A MOLYBDENUM DISILICIDE ALLOY

This is a continuation, of application Ser. No. 749,777, filed Dec. 13, 1976, now abandoned.

BACKGROUND OF THE INVENTION

1. Field of the Invention

The invention pertains to silicon carbide bodies of low porosity.

2. Prior Art

For a long time, silicon carbide, SiC, has been recognized as an oxidation resistant, heat resistant material, and bodies of that material have been utilized industrially within many fields, such as for electrical resistance heating elements and refractory bricks. However, one drawback with such bodies of silicon carbide has been their porosity, ordinarily of the magnitude of about 30 percent by volume, whereby the capability of the bodies to withstand oxidation is far less than would be the case if the bodies had no porosity.

Therefore, a goal has been to provide silicon carbide bodies having a low porosity, and a number of different ways to that end have been proposed.

One prior way comprises, for sintering together the bodies from silicon carbide powder, the technique, known from the ceramic industry, of utilizing a gradation of the silicon carbide. This method involves a choice of that particular particle size distribution which affords the highest possible degree of packing. Utilizing that technique it has been possible to provide bodies having a porosity of slightly less than 30 percent by volume.

Another prior way of reducing the porosity of the silicon carbide bodies comprises sintering very fine grained powder mixtures of silicon carbide under a high pressure and at a very elevated temperature. By that technique almost porefree bodies have been obtained. It is true that such bodies have very fine properties, but the method is extremely expensive in as much as it requires the use of specially made graphite molds which can ordinarily not be used for more than one or two times each. Furthermore, elongated bodies or bodies having a complicated design cannot be manufactured by this method.

A third prior way of ensuring a low porosity comprises the addition, to the silicon carbide powder mixture, of a material containing carbon or which forms carbon on heating thereof, and sintering that powder mixture into an intermediate body. Then these intermediate bodies are treated with silicon or a material containing silicon, so that a new production of silicon carbide takes place within the pores, i.e. by siliconizing of the carbon.

A fourth, and to a certain extent similar, prior way comprises the steps of first producing by sintering, from a silicon carbide powder mixture, an intermediate body in the shape of a silicon carbide skeleton, and then, by immersing or the like, impregnating this skeleton with a material containing carbon or having the property of forming carbon on heating thereof, which carbon is then siliconized. One example of such a material is furfurol. An alternative to the use of silicon carbide powder as a base material would be to start with a suitable carbon powder mixture or a carbon-silicon powder mixture, which is treated with silicon to form an intermediate body in the form of a silicon carbide skeleton.

The just described prior methods have proven to be excessively elaborate. This is partly due to the difficulty in obtaining an even distribution of the porosity of the intermediate bodies and partly because of the problem that ordinarily a small quantity of free silicon has been found remaining in the bodies after the siliconizing step. This free silicon is subjected to an internal oxidation, which gradually breaks down the material, if the material is used in an oxidizing atmosphere at temperatures about the melting point of silicon or higher. Therefore, it has been necessary to remove the superfluous silicon in a finishing step, which step involves unnecessary costs and has been impossible to carry out without a deterioration of the qualities of the material.

Beyond the above mentioned problems the prior art techniques for the manufacture of low porosity silicon carbide bodies suffer from the drawback that they are unsatisfactory with regard to the protection against environmental pollution.

SUMMARY OF THE INVENTION

According to the invention there is provided a body comprising silicon carbide and an alloy of molybdenum and silicon. The silicon carbide forms a skeleton body which is pore free in itself, occupies at least 70 percent by volume of the volume of the body and has the intercommunicating cavities thereof entirely filled by the in itself almost pore free molybdenum disilicide alloy.

For the manufacture of bodies according to the invention silicon carbide is used as a base material. Preferably a fine grained silicon carbide of the type which may be formed by the extrusion or slip casting techniques is used. It does not appear to be critical how the particle size is chosen but it has proven practical to use a material which essentially has a particle size less than 50 microns. This material is mixed with suitable binding agents in a manner known per se and is formed into shaped bodies having the desired final shape. These bodies are then dried and, if desired, heat treated in order to impart thereto the necessary "green strength" for the further handling.

Further steps of the manufacture of the shaped bodies are an introduction therein of carbon-containing substances which are pyrolyzed, and to silicidize that carbon in situ into silicon carbide. Preferably, as a carbon containing substance, an aqueous solution of an organic substance is used which gives, at the pyrolysis, at least 0.15 g and preferably at least 0.30 g carbon per cubic centimeter of the solution. It has been found particularly advantageous to use an aqueous solution of sucrose, particularly cane sugar.

The introduction of the carbon containing substance may take place by immersion of the bodies into an aqueous solution of cane sugar, for instance; such a solution may contain, at room temperature, as much as 65 percent by weight of sugar and 35 percent by weight of water. The shaped bodies will be filled entirely by the sugar solution and are then slowly dried, for removal of the water. Ordinarily, one such immersion will suffice, but if desired the immersing and drying steps may be repeated once or twice.

When the water has been removed from the shaped bodies they are heated, e.g. in a closed vessel, up to a temperature sufficient for the sugar to decompose chemically into carbon and water vapor, viz. a temperature of the magnitude of 400° C. Following that pyrolysis additional immersions into sugar solution and subsequent pyrolysis may be performed in order to increase the amount of carbon within the pores of the shaped bodies. In this manner the pores of the shaped bodies are filled by between 1 and 10 percent by volume of carbon which is then in situ siliconized into silicon carbide. With a porosity of the shaped bodies of about 30 percent by volume it has been found advantageous to add about 7 to 9 percent by volume of carbon which is then in situ siliconized into silicon carbide.

Silicon carbide bodies of the above described type having comparatively low porosity may be manufactured in an extremely simple, inexpensive and reliable way, and are useful for a wide variety of different technical applications. However, according to the invention a considerable improvement of the properties of the bodies with respect to their capability of withstanding oxidation and their bending strength is achieved by infiltration of the bodies with an oxidation resistant and heat resistant infiltration material, such as a suitable alloy of molybdenum and silicon.

EXAMPLE

Silicon carbide powder with a particle size less than about 50 microns and a particle size range corresponding to an average particle size of about 10 microns was mixed in a so called double-Z mixer with 1 percent by weight of colloidal graphite and 3.5 percent by weight of a cellulose ester glue, "Modocoll M" ("Modocoll" is a registered trademark of Mo och Domsjo Aktiebolag, Harnosand, Sweden). Water was added in such an amount that a plastic mass was obtained, the water content of which was about 15 percent by weight. The mass was extruded by means of a plunge extruder into a tube having an outer diameter of 22 millimeters and an internal diameter of 16 millimeters.

Tubes about one meter long were placed on drying equipment with infrared bulbs and, as the water had been removed, the tubes were fired in a graphite tube furnace at a temperature of 2150° C. in argon atmosphere. The strength of the tubes after that treatment was very good and permitted the continued process without crush losses.

The tubes were immersed into a 50 percent solution of cane sugar in water. After the immersion the tubes were slowly and carefully dried at a temperature slowly increasing up to 150° C. and at such a rate that no foaming was visible externally of the tubes which corresponded to a temperature increase from room temperature up to 150° C. within the course of 60 minutes.

Then, the dried tubes were placed in a closed sheet metal box which was heated up a temperature of 450° C. and was maintained at that temperature for one hour, whereby the sugar was pyrolyzed into carbon without being simultaneously subjected to oxidation by air. When the sheet metal box had cooled down the tubes were removed and were internally filled by silicon powder having a particle size less than 50 microns. The silicon powder was packed loosely within the tubes and the tubes were externally provided with first a thin layer of paper and externally thereof graphite powder in order to prevent oxidation during the heating at the siliconizing process to follow.

The graphite packed tubes were placed in a graphite vessel and then fired in a furnace for about 15 minutes at a temperature of 2150° C. in argon atmosphere.

Sample tubes were picked out for control purposes. It was found that the sugar carbon had converted entirely into silicon carbide which, in a remarkable manner, had combined with and bonded to the original silicon carbide particles to form a very dense sintered body where some of the original particle boundaries were visible only with difficulty and under a high degree of magnification. The tubes had a porosity of about 25 percent by volume and, thus, about 75 percent by volume was constituted by the silicon carbide.

The remaining siliconized tubes were then subjected to a final treatment, viz. an infiltration with a molybdenum-silicon alloy. The siliconized tubes were filled with a powder mixture comprising 40 parts by weight of $MoSi_2$ powder and 60 parts by weight of silicon powder. The molybdenum disilicide powder had a particle size less than 0.1 millimeter. In this case the tubes were not covered by any protective layer of any kind. The sintering at a temperature of 2150° C. in argon atmosphere was repeated, whereby all pores were filled by infiltration with a molybdenum-silicon alloy, the analysis of which corresponded 50 percent by weight of $MoSi_2$ and 50 percent by weight of silicon. The small change of composition of the alloy was due to the fact that some of the silicon passed away by vaporization as the vapor pressure of silicon is higher than that of $MoSi_2$ at the temperature in question.

The finished tubes had several interesting properties. The capability of withstanding oxidation up to a temperature of 1500° C. in air was found to be about four times better than for corresponding commercially available bodies having about 18 percent by volume porosity and consisting solely of self-bound silicon carbide. The bending strength at room temperature was between 18 and 22 $kp/mm^2$ and increased gradually up to a temperature of about 1400° C. Also the resistance to thermal shocks, measure by heating in a furnace up to a temperature of 1400° C. followed by immersion into cool water, repeated until rupture, was considerably better than for a corresponding porous body, consisting solely of silicon carbide and without a molybdenum-silicon alloy in the pores thereof.

The specific electrical resistance was measured as a function of the temperature and was found to correspond to a curve having a negative tendency up to a temperature of about 1100° C. whereafter the specific resistance increased slowly up to a temperature of 1500° C. A product comprising about 18 percent by volume of $MoSi_2$ and 82 percent by volume of silicon carbide showed the following values:

| Temperature in °C. | Resistivity in ohms/$mm^2$/m |
|---|---|
| 300 | 720 |
| 500 | 520 |
| 700 | 300 |
| 900 | 180 |
| 1100 | 56 |
| 1300 | 55 |
| 1500 | 63 |

In certain cases it may be found advantageous to prepare the aqueous solution of the carbon containing substance and to carry out the immersion of the intermediate bodies in that solution at a slightly elevated temperature, such as 35°-65° C., for instance.

To enhance the absorption of the aqueous solution of the carbon containing substance it may be found advantageous to carry out the immersion under a certain partial vacuum so as to effectively displace the air.

The fresh formation of silicon carbide within the pores of the intermediate bodies is, as mentioned above, advantageously carried out while using a sugar solution which affords great technical advantages. Curiously, the carbon obtained at the decomposition of the sugar is particularly well adapted to form silicon carbide with an ability to enhance the sintering together with adjacent particles of silicon carbide from the original mixture. The sugar solution also has the advantage that a great amount of carbon is obtained per volume unit. The following applies to an almost saturated solution: The solution contains about 65 percent by volume of sugar, $C_{12}H_{22}O_{11}$, the remainder being water, and the specific gravity thereof is 1.31. Thus, each cubic centimeter of the pores absorbs 0.85 grams sugar which, at pyrolysis, forms 0.42 grams of sugar carbon. At the siliconizing, that carbon amount is converted into 1.4 grams of silicon carbide which is the stoichiometric amount and the volume of which is 0.44 cm$^3$. Thus, by one single immersion into the sugar solution and subsequent pyrolysis and siliconizing about 44 percent of the porosity will be filled by freshly formed silicon carbide. It will be realized that a body having 35 percent of pores within the silicon carbide skeleton will be converted into a body having about 19 or 20 percent of pores, which is a suitable value for materials of this class. With a complete utilization of the carbon after the sugar pyrolysis one single impregnation would suffice. However, in practice, a small amount of the sugar will always be lost for which reason sometimes two or even more immersions may be found necessary.

What we claim is:

1. A silicon carbide body comprising a skeleton consisting of silicon carbide particles, said skeleton having additional amounts of silicon carbide formed in situ and bonded therein, and resulting from the reaction of a pyrolyzed carbonaceous source and silicon in stoichiometric amounts, thereby providing a body with intercommunicating cavities in which the silicon carbide occupies at least 70% by volume of the body, said cavities being filled entirely by a molybdenum-silicon alloy.

2. A body as claimed in claim 1, wherein said additional amounts of silicon carbide formed in situ result from the reaction of silicon with a pyrolyzable carbonaceous solution capable of providing at least 0.15 grams of carbon per cubic centimeter of the solution, at the pyrolysis thereof.

3. A body as claimed in claim 2, wherein said pyrolyzable carbonaceous solution is a sugar solution.

* * * * *